(12) United States Patent
Wang et al.

(10) Patent No.: US 12,095,510 B1
(45) Date of Patent: Sep. 17, 2024

(54) INFRARED COMMUNICATION METHOD AND APPARATUS, STORAGE MEDIUM AND ELECTRONIC APPARATUS

(71) Applicant: DREAME INNOVATION TECHNOLOGY (SUZHOU) CO., LTD., Jiangsu (CN)

(72) Inventors: Ruilin Wang, Jiangsu (CN); Xiaofei Yang, Jiangsu (CN); Yinbo Xu, Jiangsu (CN)

(73) Assignee: DREAME INNOVATION TECHNOLOGY (SUZHOU) CO., LTD., Suzhou (CN)

( * ) Notice: Subject to any disclaimer, the term of this patent is extended or adjusted under 35 U.S.C. 154(b) by 0 days.

(21) Appl. No.: 18/669,675

(22) Filed: May 21, 2024

Related U.S. Application Data

(63) Continuation of application No. PCT/CN2022/118372, filed on Sep. 13, 2022.

(30) Foreign Application Priority Data

Sep. 23, 2021 (CN) .......................... 202111116387.3

(51) Int. Cl.
H04B 10/516 (2013.01)
H04B 10/114 (2013.01)
H04L 43/10 (2022.01)

(52) U.S. Cl.
CPC ....... *H04B 10/516* (2013.01); *H04B 10/1143* (2013.01); *H04L 43/10* (2013.01)

(58) Field of Classification Search
None
See application file for complete search history.

(56) References Cited

U.S. PATENT DOCUMENTS 5,914,796 A 6/1999 Selin
6,088,730 A 7/2000 Kato et al.
(Continued)

FOREIGN PATENT DOCUMENTS

CN 105119907 A 12/2015
CN 105450299 A 3/2016
(Continued)

OTHER PUBLICATIONS

Notice of Allowance of counterpart Chinese Patent Application No. 202111116387.3 issued on May 31, 2023.
(Continued)

*Primary Examiner* — David W Lambert

(57) ABSTRACT

The present disclosure provides an infrared communication method and apparatus, a storage medium, and an electronic apparatus. The method includes: transmitting a first infrared signal to a target communication terminal, where the first infrared signal is an infrared signal encoded based on a level duration; and in a case that a second infrared signal replied by the target communication terminal based on the first infrared signal is received within a first target duration, transmitting a third infrared signal to the target communication terminal. By using the above technical solution, a problem that bidirectional information interaction cannot be performed due to the inability of distinguishing bidirectional infrared signals in the infrared communication method in the related art is solved.

17 Claims, 4 Drawing Sheets

(56) References Cited

U.S. PATENT DOCUMENTS

| | | | |
|---|---|---|---|
| 2005/0134476 A1 * | 6/2005 | Choi | ............ H04B 10/1141 |
| | | | 398/106 |
| 2007/0021867 A1 | 1/2007 | Woo | |
| 2017/0187457 A1 | 6/2017 | Liu et al. | |
| 2020/0052833 A1 | 2/2020 | Yang et al. | |

FOREIGN PATENT DOCUMENTS

| | | | | |
|---|---|---|---|---|
| CN | 106877925 A | | 6/2017 | |
| CN | 107919009 A | | 4/2018 | |
| CN | 108574535 A | * | 9/2018 | ........... H04B 10/508 |
| CN | 109064733 A | | 12/2018 | |
| CN | 110865645 A | | 3/2020 | |
| CN | 110876076 A | * | 3/2020 | ....... H04N 21/42221 |
| CN | 111580175 A | | 8/2020 | |
| CN | 112396819 A | | 2/2021 | |
| JP | 2002374212 A | | 12/2002 | |
| JP | 2015050657 A | | 3/2015 | |
| WO | 2021082659 A1 | | 5/2021 | |

OTHER PUBLICATIONS

Third Office Action of counterpart Chinese Patent Application No. 202111116387.3 issued on Feb. 8, 2023.
Supplementary Search Report of counterpart Chinese Patent Application No. 202111116387.3 issued on May 29, 2023.
Shunzhou Wang et al., Design of Control System of Intelligent Housekeeping Robot for Home Appliances, Journal of Shanghai Institute of Technology(Natural Science), Jun. 2016, vol. 16, No. 2.
First Search Report of counterpart Chinese Patent Application No. 202111116387.3 issued on Jul. 13, 2022.
Supplementary Search Report of counterpart Chinese Patent Application No. 202111116387.3 issued on Oct. 8, 2022.

* cited by examiner

INFRARED COMMUNICATION METHOD AND APPARATUS, STORAGE MEDIUM AND ELECTRONIC APPARATUS

CROSS REFERENCE TO RELATED APPLICATIONS

The present disclosure is a Continuation Application of International Application No. PCT/CN2022/118372, filed on Sep. 13, 2022, which claims priority to the Chinese Patent Application No. 202111116387.3, filed with the China National Intellectual Property Administration on Sep. 23, 2021 and entitled "INFRARED COMMUNICATION METHOD AND APPARATUS, STORAGE MEDIUM AND ELECTRONIC APPARATUS", which is incorporated herein by reference in its entirety.

TECHNICAL FIELD

The present disclosure relates to the field of communication, and in particular to, an infrared communication method and apparatus, a storage medium, and an electronic apparatus.

BACKGROUND

Currently, communication may be performed between communication terminals by means of infrared communication. The infrared communication is susceptible to interference. In the related art, an interference problem may be solved by incorporating a high frequency carrier and a general infrared protocol. However, this method will lead to an increase in an electronic cost. Moreover, bidirectional infrared signals cannot be distinguished due to the interference between them, so most of the current protocols are unidirectional, which cannot complete the bidirectional information interaction.

Thus, it can be seen that there is a problem that the bidirectional information interaction cannot be performed due to the inability of distinguishing bidirectional infrared signals in the infrared communication method in the related art.

SUMMARY

The objective of the present disclosure is to provide an infrared communication method and apparatus, a storage medium, and an electronic apparatus, so as to at least solve a problem that bidirectional information interaction cannot be performed due to the inability of distinguishing bidirectional infrared signals in the infrared communication method in the related art.

The objective of the present disclosure is achieved by the following technical solutions:

according to one aspect of an embodiment of the present disclosure, an infrared communication method is provided and includes: transmitting a first infrared signal to a target communication terminal, where the first infrared signal is an infrared signal encoded based on a level duration; and in a case that a second infrared signal replied by the target communication terminal based on the first infrared signal is received within a first target duration, transmitting a third infrared signal to the target communication terminal.

In an exemplary embodiment, before the transmitting a first infrared signal to a target communication terminal, the method further includes: determining a target communication mode used for infrared communication with the target communication terminal, where the target communication mode is a communication mode in which the target communication terminal is only allowed to reply after receiving an infrared signal of a local communication terminal; and controlling infrared communication between the local communication terminal and the target communication terminal according to the target communication mode.

In an exemplary embodiment, the first infrared signal is used for transmitting a header frame, an information frame, and a check frame; and the transmitting a first infrared signal to a target communication terminal includes: transmitting the header frame to the target communication terminal by a high-level signal within a first duration, where the header frame is used for indicating an initial position of the first infrared signal; transmitting the information frame and the check frame to the target communication terminal, where a first symbol in the information frame and the check frame is transmitted by a high-level signal within a second duration, a second symbol in the information frame and the check frame is transmitted by a low-level signal within a third duration, and the second duration is different from the third duration.

In an exemplary embodiment, the first infrared signal carries a heartbeat frame; and after the transmitting a first infrared signal to a target communication terminal, the method further includes: in a case that the infrared signal replied by the target communication terminal based on the first infrared signal is not received within the first target duration, determining a cumulative number of times that an infrared signal replied by the target communication terminal is not received; in a case that the cumulative number of times is greater than or equal to a target number of times threshold, performing a reset operation on the infrared communication with the target communication terminal; and in a case that the cumulative number of times is less than the target number of times threshold, updating the cumulative number of times and retransmitting the first infrared signal to the target communication terminal.

In an exemplary embodiment, the first infrared signal carries a target frame and the target frame is used for controlling the target communication terminal to perform a target operation; and after the transmitting a first infrared signal to a target communication terminal, the method further includes: in a case that the infrared signal replied by the target communication terminal based on the first infrared signal is not received within the first target duration, continuously transmitting the first infrared signal to the target communication terminal within the first target duration until the infrared signal replied by the target communication terminal is received.

In an exemplary embodiment, the transmitting a third infrared signal to the target communication terminal includes: transmitting the third infrared signal carrying a heartbeat frame to the target communication terminal.

In an exemplary embodiment, the target communication terminal is a dust collection station, and the local communication terminal for transmitting the first infrared signal is a host; and before the transmitting a first infrared signal to a target communication terminal, the method further includes: controlling the host to connect to a charging base; waiting for receiving an indication signal transmitted by the dust collection station within a second target duration, where the indication signal is used for indicating that the host is not in a charging status; and in a case that the indication signal is received, re-controlling the host to connect to the charging base.

According to another aspect of an embodiment of the present disclosure, an infrared communication apparatus is further provided and includes: a first transmitting unit, configured to transmit a first infrared signal to a target communication terminal, where the first infrared signal is an infrared signal encoded based on a level duration; and a second transmitting unit, configured to transmit a third infrared signal to the target communication terminal in a case that a second infrared signal replied by the target communication terminal based on the first infrared signal is received within a first target duration.

In an exemplary embodiment, the apparatus further includes: a first determining unit, configured to determine a target communication mode used for infrared communication with the target communication terminal before the transmitting a first infrared signal to a target communication terminal, where the target communication mode is a communication mode in which the target communication terminal is only allowed to reply after receiving an infrared signal of a local communication terminal; and a first controlling unit, configured to control infrared communication between the local communication terminal and the target communication terminal in the target communication mode.

In an exemplary embodiment, the first infrared signal is used for transmitting a header frame, an information frame, and a check frame; and the first transmitting unit includes: a first transmitting module, configured to transmit the header frame to the target communication terminal by a high-level signal within a first duration, where the header frame is used for indicating an initial position of the first infrared signal; a second transmitting module, configured to transmit the information frame and the check frame to the target communication terminal, where a first symbol in the information frame and the check frame is transmitted by a high-level signal within a second duration, a second symbol in the information frame and the check frame is transmitted by a low-level signal within a third duration, and the second duration is different from the third duration.

In an exemplary embodiment, the first infrared signal carries a heartbeat frame; and the apparatus further includes: a second determining unit, configured to: after the transmitting a first infrared signal to a target communication terminal, in a case that the infrared signal replied by the target communication terminal based on the first infrared signal is not received within the first target duration, determine a cumulative number of times that an infrared signal replied by the target communication terminal is not received; an execution unit, configured to execute a reset operation on infrared communication with the target communication terminal in a case that the cumulative number of times is greater than or equal to a target number of times threshold; and a third transmitting unit, configured to update the cumulative number of times and retransmit the first infrared signal to the target communication terminal in a case that the cumulative number of times is less than the target number of times threshold.

In an exemplary embodiment, the first infrared signal carries a target frame and the target frame is used for controlling the target communication terminal to execute a target operation; and the apparatus further includes: a fourth transmitting unit, configured to: after the transmitting a first infrared signal to a target communication terminal, in a case that the infrared signal replied by the target communication terminal based on the first infrared signal is not received within the first target duration, continuously transmit the first infrared signal to the target communication terminal within the first target duration until the infrared signal replied by the target communication terminal is received.

In an exemplary embodiment, the second transmitting unit includes: a third transmitting module, configured to transmit the third infrared signal carrying a heartbeat frame to the target communication terminal.

In an exemplary embodiment, the target communication terminal is a dust collection station, and the local communication terminal for transmitting the first infrared signal is a host; and the apparatus further includes: a second controlling unit, configured to control the host to connect to a charging base before the transmitting a first infrared signal to a target communication terminal; a receiving unit, configured to wait for receiving an indication signal transmitted by the dust collection station within a second target duration, where the indication signal is used for indicating that the host is not in a charging status; and a third controlling unit, configured to re-control the host to connect to the charging base in a case that the indication signal is received.

According to still another aspect of an embodiment of the present disclosure, a computer-readable storage medium is further provided, and a computer program is stored in the computer-readable storage medium, where the computer program is set to execute the infrared communication method at runtime.

According to still another aspect of an embodiment of the present disclosure, an electronic apparatus is further provided and includes a memory, a processor, and a computer program that is stored in the memory and can be run on the processor, where the processor executes the infrared communication method through the computer program.

In the embodiments of the present disclosure, the infrared signal is represented by the level duration, the infrared communication is performed based on a response mode, and the first infrared signal is transmitted to the target communication terminal, where the first infrared signal is the infrared signal encoded based on the level duration; and in the case that the second infrared signal replied by the target communication terminal based on the first infrared signal is received within the first target duration, the third infrared signal is transmitted to the target communication terminal. Because the infrared communication is performed based on the response mode, a next infrared signal is transmitted after waiting for a period of time after the infrared signal is transmitted to an opposite terminal, so as to achieve the purpose that bidirectional infrared signals can be distinguished based on the infrared signals actually transmitted; meanwhile by using the level duration to represent the infrared signal, the hardware cost of the infrared communication and the requirements of infrared signal lights can also be reduced without high-frequency carriers, so that the technical effects of ensuring the bidirectional information interaction between communication terminals and reducing the infrared communication cost are achieved, and thus a problem that bidirectional information interaction cannot be performed due to the inability of distinguishing bidirectional infrared signals in the infrared communication method in the related art is further solved.

BRIEF DESCRIPTION OF THE DRAWINGS

The accompanying drawings herein are incorporated in the description as a part of the description, showing embodiments that are in accordance with the present disclosure, and used together with the description to explain the principle of the present disclosure.

To describe the technical solutions in the embodiments of the present disclosure or in the prior art more clearly, the following briefly describes the accompanying drawings required for describing the embodiments or the prior art. Apparently, a person of ordinary skill in the art may still derive other drawings from these accompanying drawings without creative efforts.

DETAILED DESCRIPTION

The following describes the present disclosure in detail with reference to the accompanying drawings and embodiments. It should be noted that, in the absence of a conflict, the embodiments and features in the embodiments in the present disclosure may be combined with each other.

It should be noted that the terms "first", "second", and the like in the description, claims, the above accompany drawings of the present disclosure are used to distinguish similar objects and are not necessarily used to describe a specific order or sequence.

Figure 1:
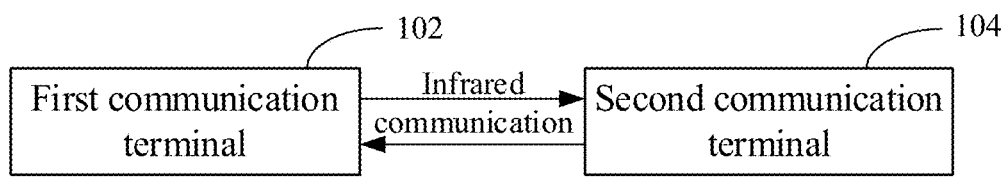
FIG. 1 is a schematic diagram of hardware environment of an optional infrared communication method according to an embodiment of the present disclosure.

According to one aspect of an embodiment of the present disclosure, an infrared communication method is provided. Optionally, in the embodiment, the infrared communication method may be applied to a hardware environment composed of a first communication terminal 102 and a second communication terminal 104 as shown in FIG. 1. As shown in FIG. 1, the first communication terminal 102 (first infrared communication terminal) and the second communication terminal 104 (second infrared communication terminal) may have a binding relationship, between which infrared communication may be performed.

The infrared communication method in the embodiment of the present disclosure may be executed by the first communication terminal 102 or the second communication terminal 104, or by the first communication terminal 102 and the second communication terminal 104 together. The infrared communication method in the embodiment of the present disclosure, executed by the first communication terminal 102 or the second communication terminal 104, may also be executed by a client installed thereon.

Figure 2:
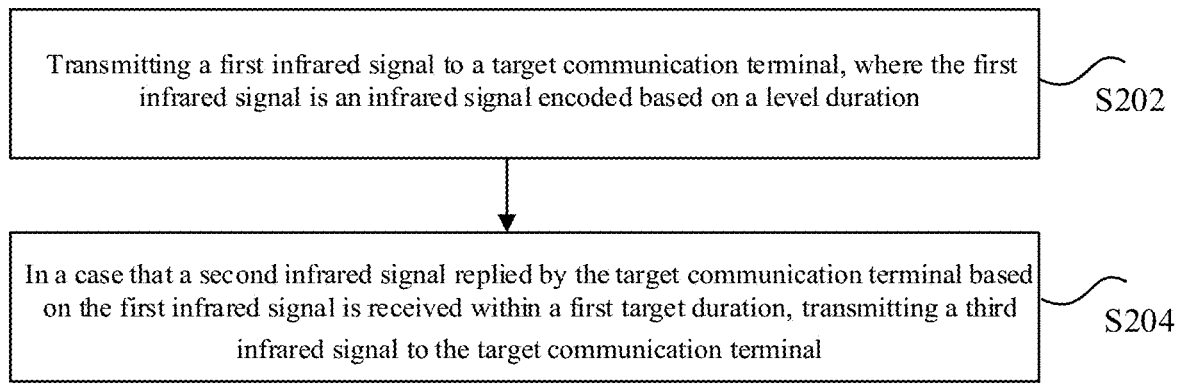
FIG. 2 is a flow diagram of an optional infrared communication method according to an embodiment of the present disclosure.

The infrared communication method in the embodiment, executed by the first communication terminal 102, is taken as an example, where FIG. 2 is a schematic flow diagram of an optional infrared communication method according to an embodiment of the present disclosure. As shown in FIG. 2, the process of the method may include the following steps:

Step S202: transmitting a first infrared signal to a target communication terminal, where the first infrared signal is an infrared signal encoded based on a level duration.

The infrared communication method in the embodiment may be applied to short-distance infrared communication scenarios. The above-mentioned infrared communication is a communication mode that uses infrared light signals to transmit information. The infrared communication herein can be performed between two infrared communication devices or between a plurality of infrared communication devices, which is not limited herein. Two infrared communication terminals for the infrared communication may be called a local communication terminal (for example, a dust collection host terminal, hereinafter referred to as a host) and the target communication terminal (for example, a dust collection base station terminal, hereinafter referred to as a dust collection station) respectively. For example, the host herein may be a cleaning robot, and the dust collection station herein may be a dust collection barrel. When the cleaning robot is connected to a charging base and executes cleaning or feeds back its charging status in real time, the cleaning robot may communicate with the dust collection barrel by means of the infrared communication, so that the relative position and connection status of the cleaning robot and the dust collection barrel can be confirmed by the dust collection barrel. The communication mode between the above two communication terminals may be a master-slave response mode or other communication modes. In the embodiment, the master-slave response mode between the local communication terminal (for example, the host) and the target communication terminal (for example, the dust collection station) is taken as an example.

In the embodiment, when the local communication terminal is in a transmitting status, the infrared signal to be transmitted to the target communication terminal may be encoded based on the level duration, and the communication terminal may transmit the encoded infrared signal (namely, the first infrared signal) to the target communication terminal, so as to complete the information transmission process.

The infrared signal may be encoded in a binary coding method based on the level duration, that is, the level duration is used to represent binary 0 and 1. The level duration may be limited by setting a level duration value. When a high-level duration is greater than or equal to a set level duration value, it may be determined that the high level represents 1 in a binary code; and when a low-level duration is less than the set level duration value, it may be determined that the low level represents 0 in the binary code. The above encoding method may be used without carriers, thereby reducing the hardware cost and the requirements for infrared signal lights.

For example, the level duration value may be set to 1 ms. When the level duration is greater than or equal to 1 ms, the high level may represent 1 in the binary code, and when the level duration is less than 1 ms, the low level may represent 0 in the binary code.

Step S204: in a case that a second infrared signal replied by the target communication terminal based on the first infrared signal is received within a first target duration, transmitting a third infrared signal to the target communication terminal.

In the embodiment, in order to confirm whether the infrared signal transmitted by the local communication terminal to the target communication terminal is successfully received by the target communication terminal, and meanwhile in order to avoid signal infection, it may wait for a period of time (namely, the first target duration) after transmitting the first infrared signal to determine whether the infrared signal replied by the target communication terminal based on the first infrared signal is received. Herein, the first target duration may be configured according to needs, and it may be 100 ms, 150 ms, 200 ms, or other durations, which is not limited herein. Whether the local communication terminal and the target communication terminal complete this infrared communication may be determined by determining whether an infrared signal replied by the target communication terminal based on the first infrared signal is received within a wait duration.

When the target communication terminal is in a receiving status, it may wait to receive the infrared signal from the local communication terminal. If the first infrared signal is received, the target communication terminal may enter the transmitting status, prepare a reply code, and transmit the prepared reply code to the local communication terminal through the second infrared signal.

Optionally, the first target duration may also be set at the target communication terminal. If the target communication terminal fails to receive the infrared signal transmitted by the local communication terminal for more than the first target duration in the waiting status, it may consider that this communication has failed, accumulate one communication failure and re-enter the receiving status to proceed next communication.

For example, the communication waiting time may be set to 100 ms, within which the infrared signal transmitted by the opposite terminal is waited to be received. For a master communication terminal, it may wait to receive the infrared signal replied from the communication terminal, and for a slave communication terminal, it may wait to receive the infrared signal transmitted by the master communication terminal and reply to the received infrared signal.

If the second infrared signal replied by the target communication terminal is received within the first target duration, the local communication terminal may decode the replied infrared signal, and determine that the target communication terminal has successfully received the first infrared signal transmitted by the local communication terminal, so as to determine that this communication is successful.

In the embodiment, after an infrared communication is completed, the local communication terminal may transmit a third infrared signal to the target communication terminal to start a new infrared communication between the local communication terminal and the target communication terminal. Herein, the third infrared signal and the first infrared signal may be a same infrared signal, that is, they both carry same information and are encoded by a same encoding method, or they may be different infrared signals, that is, they both carry different information or are encoded by different encoding methods. In the embodiment, the third infrared signal is not limited.

The first infrared signal is transmitted to the target communication terminal through the above Steps S202 to S204, where the first infrared signal is an infrared signal encoded based on the level duration. In a case that the second infrared signal replied by the target communication terminal based on the first infrared signal is received within the first target duration, the third infrared signal is transmitted to the target communication terminal, thereby solving a problem that bidirectional information interaction cannot be performed due to the inability of distinguishing bidirectional infrared signals existed in the infrared communication method in the related art, ensuring the bidirectional information interaction between communication terminals and reducing the cost of infrared communication.

In an exemplary embodiment, before transmitting the first infrared signal to the target communication terminal, the method further includes:

S11: determining a target communication mode used for the infrared communication with the target communication terminal, where the target communication mode is a communication mode in which the target communication terminal is allowed to reply only after receiving an infrared signal of the local communication terminal; and S12: controlling the infrared communication between the local communication terminal and the target communication terminal according to the target communication mode.

Due to the characteristics of the infrared communication, the anti-interference ability of the infrared communication is weak. In adjacent spaces, infrared signals will interfere with each other, leading to the failure of communication. In order to avoid interference in infrared signal transmission, the communication logic of the master-slave response mode may be adopted to avoid the time period that is easy to generate interference. The master-slave response mode may ensure that only one communication terminal can transmit an infrared signal at a same time and in a same space, so it can avoid the interference of error codes when the infrared signals are transmitted. In addition, the communication logic may also include a response logic to ensure that the information transmitted by the local communication terminal can be effectively received by the target communication terminal.

Before the information transmission is performed between the local communication terminal and the target communication terminal, the local communication terminal may first determine the communication mode (namely, the target communication mode) between the local communication terminal and the target communication terminal. The target communication mode may be the master-slave response mode, namely, the communication mode in which the target communication terminal is only allowed to reply after receiving the infrared signal of the local communication terminal. The communication terminal may control the transmission of infrared information between the local communication terminal and the target communication terminal according to the determined communication mode.

For example, after confirming the communication mode between the host and the dust collection station is the master-slave response mode, the host may be set as the master device and the dust collection station may be determined as the slave device according to the master-slave response mode. The host has the initiative to transmit a signal, and the dust collection station is equivalent to the slave and may make a reply only after receiving the infrared signal transmitted by the host.

Through the embodiment, communication between the communication terminals is controlled in the master-slave response mode, which can avoid the occurrence of the error codes during the infrared communication and improving the accuracy of information interaction during the infrared communication.

In an exemplary embodiment, the anti-interference ability is reduced because no carrier is adopted for encoding. In order to enhance the anti-interference of the infrared communication and ensure the integrity of transmitted information, corresponding processing may be performed at a protocol level to ensure the integrity of the information. In the embodiment, a header frame and a check frame may be specified in a communication protocol, and an information frame is included therebetween. The first infrared signal may be an infrared signal including the header frame, the information frame, and the check frame. Correspondingly, transmitting the first infrared signal to the target communication terminal may include:

S21: transmitting the header frame to the target communication terminal by a high-level signal within a first duration, where the header frame is used for indicating an initial position of the first infrared signal; and S22: transmitting the information frame and the check frame to the target communication terminal, where a first symbol in the information frame and the check frame is transmitted by a high-level signal within a second duration, a second symbol in the information frame and the check frame is transmitted by a low-level signal within a third duration, and the second duration is different from the third duration.

In the embodiment, the initial position of communication may be identified by the header frame. Control information, such as a pilot code, may be carried in the header frame, and the pilot code may maintain at the high level for a period of time (namely, the first duration, for example, 3 ms) or more. Moreover, it may specify the pilot code while also specifying that it is at a low level in the idle time in the communication protocol. Such code has no length limit and may be extended indefinitely. For this communication, the local communication terminal may transmit the header frame to the target communication terminal by the high-level signal within the first duration, where the header frame is used for indicating the initial position of the first infrared signal.

After the header frame is transmitted, the first infrared signal may also carry the information frame and the check frame. The information frame herein may be used for indicating a configuration file of the coding bit number of the header frame, the check frame or other frames in data frames transmitted by the infrared communication based on binary coding. Specific coding bits of the header frame, end frame, check frame and other check frames in the data frames in the transmitted binary-coded infrared signals may be determined through coding information in the information frame.

For the check frame, in consideration of the fact that the infrared communication itself is equivalent to a single-line half-duplex communication method, it may adopt the master-slave communication mode, but there is also an inevitable short delay. In order to prevent communication loss caused by the delay, CRC (Cyclic Redundancy Check) may be added to the end of the information, and key information will be checked repeatedly during the communication, so as to ensure the overall anti-interference, ensure that the key information is accurately delivered, prevent incorrect action caused by the error codes of the protocol, and further strengthen the strength of the protocol.

Herein, the check frame may be a check code located at the end of the data frame, a check code with a fixed number of digits may be generated at the end of the data frame through CRC check, which may be used for checking errors that may occur during signal transmission. Duplicate check may be added to the communication logic, and a code value transmitted by itself may not be received.

The first symbol (for example, 1) in the above information frame and check frame may be transmitted by the high-level signal within the second duration, and the second symbol (for example, 0) may be transmitted by the low-level signal within the third duration. The second duration is different from the third duration, where the second duration may be greater than or less than the third duration, which is not limited in the embodiment.

According to the embodiment, the header frame and the check frame are specified in the communication protocol, and the information frame is included therebetween. The initial position of the communication is identified by the header frame, and the infrared signal is checked by the check frame, so that the overall anti-interference of the infrared communication can be ensured and the reliability of the information interaction of the infrared communication can be improved.

In an exemplary embodiment, the protocol frame may include an ordinary heartbeat frame. The heartbeat frame may be transmitted in real time to minimize the switching delay of status bits. For the infrared communication between the host and the dust collection station, the heartbeat frame is mainly used for describing the status of the dust collection station, for example, uploading the status of a cover button of the dust collection station, an air pressure alarm and the health status, etc. Meanwhile, a light effect instruction may be issued to ensure the timeliness of the light effect. The first infrared signal may carry the heartbeat frame. The real-time receiving status of the target communication terminal may be monitored by transmitting the infrared signal carrying the heartbeat frame in real time, thereby enhancing the interactivity between the communication terminals.

In the embodiment, after transmitting the first infrared signal to the target communication terminal, the method further includes:

S31: in a case that an infrared signal replied by the target communication terminal based on the first infrared signal is not received within the first target duration, determining a cumulative number of times that the infrared signal replied by the target communication terminal is not received;

S32: in a case that the cumulative number of times is greater than or equal to a target number of times threshold, executing a reset operation on the infrared communication with the target communication terminal; and S33: in a case that the cumulative number of times is less than the target number of times threshold, updating the cumulative number of times and retransmitting the first infrared signal to the target communication terminal.

After transmitting the first infrared signal to the target communication terminal, if the infrared signal replied by the target communication terminal is not received within the first target duration after transmitting the first infrared signal, it may determine that this infrared communication is failed. Communication failure may be accidental (for example, the communication failure not caused by device failure or abnormal connection), or may be caused by the device failure or the abnormal connection. In order to ensure the reliability of communication, the infrared communication with the target communication terminal may be reset directly after the communication failure is determined.

Optionally, in order to ensure the timeliness of the communication, the number of times of communication failure may be counted, and when the number of times of the communication failure reaches a set number of times threshold (namely, the target number of times threshold), the reset operation of infrared communication with the target communication terminal can be executed. After determining that this infrared communication has failed, the local communication terminal may determine a cumulative number of times that the infrared signal replied by the target communication terminal is not received, where the cumulative number of times may be an original cumulative number of times (excluding this communication failure) or the value obtained by adding 1 to the original cumulative number of times (including this communication failure).

If the cumulative number of times reaches the target number of times threshold, the reset operation of the infrared communication with the target communication terminal may be executed, otherwise, the first infrared signal may be re-transmitted to the target communication terminal. In addition, the current cumulative number of times may be updated, for example, by adding 1. Herein, the operation of updating the cumulative number of times is only executed once every round of communication failure, and such operation may be executed before or after determining whether the target number of times threshold is reached, which is not limited in the embodiment.

For example, the cumulative number of times threshold of the communication failure may be set to 20. When the cumulative number of times of the communication failure reaches 20, the reset operation of the infrared communication of the local communication terminal is executed, and when the cumulative number of times of the communication failure is less than 20, the current cumulative number of times of the communication failure is updated and the infrared signal is retransmitted to the target communication terminal.

Through the embodiment, a case where the infrared communication caused by an accidental communication failure is reset can be avoided by accumulating the number of times of the communication failure, and the stability and timeliness of the infrared communication can be improved.

In an exemplary embodiment, the protocol frame may include a key protocol frame. For example, the protocol frame may be divided into two types, namely, an ordinary heartbeat frame and a key protocol frame. The protocol frame may be responsible for key actions of the local communication terminal, which may affect essential functions of the target communication terminal. Therefore, the key protocol frame cannot be lost. For the host, the key protocol frame may be responsible for key actions of the host, such as the dust collection and a barometer. The key protocol frame is transmitted only when it exists, whether the key protocol frame is successfully transmitted may be checked, only the key protocol frame is successfully transmitted, a bus is released and the other frames (for example, the heartbeat frame) continue to be transmitted. Otherwise, the key protocol frame continues to be transmitted until verification timeout.

For the first infrared signal, it may carry the target frame that is used for controlling the target communication terminal to execute a target operation, and the target frame may be the foregoing key protocol frame. Correspondingly, after transmitting the first infrared signal to the target communication terminal, the method further includes:

S41: in a case that the infrared signal replied by the target communication terminal based on the first infrared signal is not received within the first target duration, continuously transmitting the first infrared signal to the target communication terminal according to the first target duration until receiving the infrared signal replied by the target communication terminal.

In the embodiment, if the first infrared signal carries the target frame, and if the infrared signal replied by the target communication terminal is not received within the first target duration, the local communication terminal may continuously transmit the first infrared signal to the target communication terminal before receiving the infrared signal replied by the target communication terminal.

Optionally, the local communication terminal may also stop transmitting the first infrared signal to the target communication terminal after the verification timeout, and transmit prompt information through the local communication terminal or a terminal device associated with the local communication terminal to prompt abnormal infrared communication between the local communication terminal and the target communication terminal.

Through the embodiment, the infrared signal carrying the key protocol frame continues to be transmitted to the target communication terminal until the infrared signal replied by the target communication terminal is received, which may ensure the reliability and stability of the infrared communication.

In an exemplary embodiment, transmitting the third infrared signal to the target communication terminal may include:

S51: transmitting the third infrared signal carrying a heartbeat frame to the target communication terminal.

In the embodiment, if the second infrared signal replied by the target communication terminal is received within the first target duration, it may determine that the target frame has been successfully transmitted. Because the target frame (namely, the key protocol frame) is only transmitted when it exists, when the target frame is successfully transmitted and no new target frame needs to be transmitted, the local communication terminal may transmit the third infrared signal carrying the heartbeat frame to the target communication terminal. In this case, the first infrared signal and the third infrared signal are different infrared signals.

Through the embodiment, after the key protocol frame is successfully transmitted, the infrared signal carrying the ordinary heartbeat frame is restarted to be transmitted, which can ensure the reliability of communication between the local communication terminal and the target communication terminal.

In an exemplary embodiment, the target communication terminal is a dust collection station, the local communication terminal for transmitting the first infrared signal is a host, and the performed infrared communication is an infrared communication between the host and the dust collection station, which may be executed immediately after the host is powered on, or may be executed in a specific status. The specific status may be the operating status of the host, the low power status of the host, or other statuses. Correspondingly, before transmitting the first infrared signal to the target communication terminal, the method further includes:

S61: controlling the host to connect to a charging base;

S62: waiting to receive an indication signal transmitted by the dust collection station within the second target duration, where the indication signal is used for indicating that the host is not in a charging status; and S63: in a case that the indication signal is received, re-controlling the host to connect to the charging base.

In the embodiment, before no information interaction between the host and the dust collection station starts, the host may be controlled to connect to the charging base on the dust collection station, so that the host is in the charging status. For the host, a control chip thereof may control the host to connect to the charging base, and the charging base may be located on the dust collection station or at other positions, which is not limited in the embodiment.

The host may wait to receive an indication signal transmitted by the dust collection station within the second target duration, where the indication signal is used for indicating that the host is not in the charging status. For the dust collection station, it may continuously transmit the above indication information when the host does not return for charging. For example, the indication signal is transmitted once every second target duration until it is determined that the host has returned for charging, that is, it is determined that the host has been connected to the charging base.

The second target duration herein may be a preconfigured duration, and may be the same as or different from the first target duration. The indication signal herein may be used for indicating that the host is not in the charging status. In a case that the indication signal transmitted by the dust collection station is received, the host may re-control the host to connect to the charging base, so that the host is in the charging status.

For example, after it is determined that the host has disconnected with the charging base and the power of the host is lower than a target power threshold or the returning for charging instruction of the host is received, the dust collection station may continue to transmit codes and wait for the host to return for charging. The control chip of the host may control the host to connect to the charging base, and then determine whether the dust collection station stops transmitting the codes, so as to determine whether the connection with the charging base is successful. If the dust collection station does not stop transmitting the codes, the control chip of the host may re-control the host to connect to the charging base.

In the embodiment, it is determined whether the host is connected to the charging base by controlling the interaction between the host and the charging base, which can improve the control accuracy of the host, ensure the normal function of an operation between the host and the dust collection station, and improve the stability of the infrared communication.

The infrared communication method in the embodiment will be explained with reference to optional examples. In the optional example, a dust collection infrared communication solution is provided. The local communication terminal is the host and the target communication terminal is the dust collection station. A communication status between the host and the dust collection station may include the following four types: a transmitting status, a receiving status, a timeout status and a waiting status.

Figure 3:
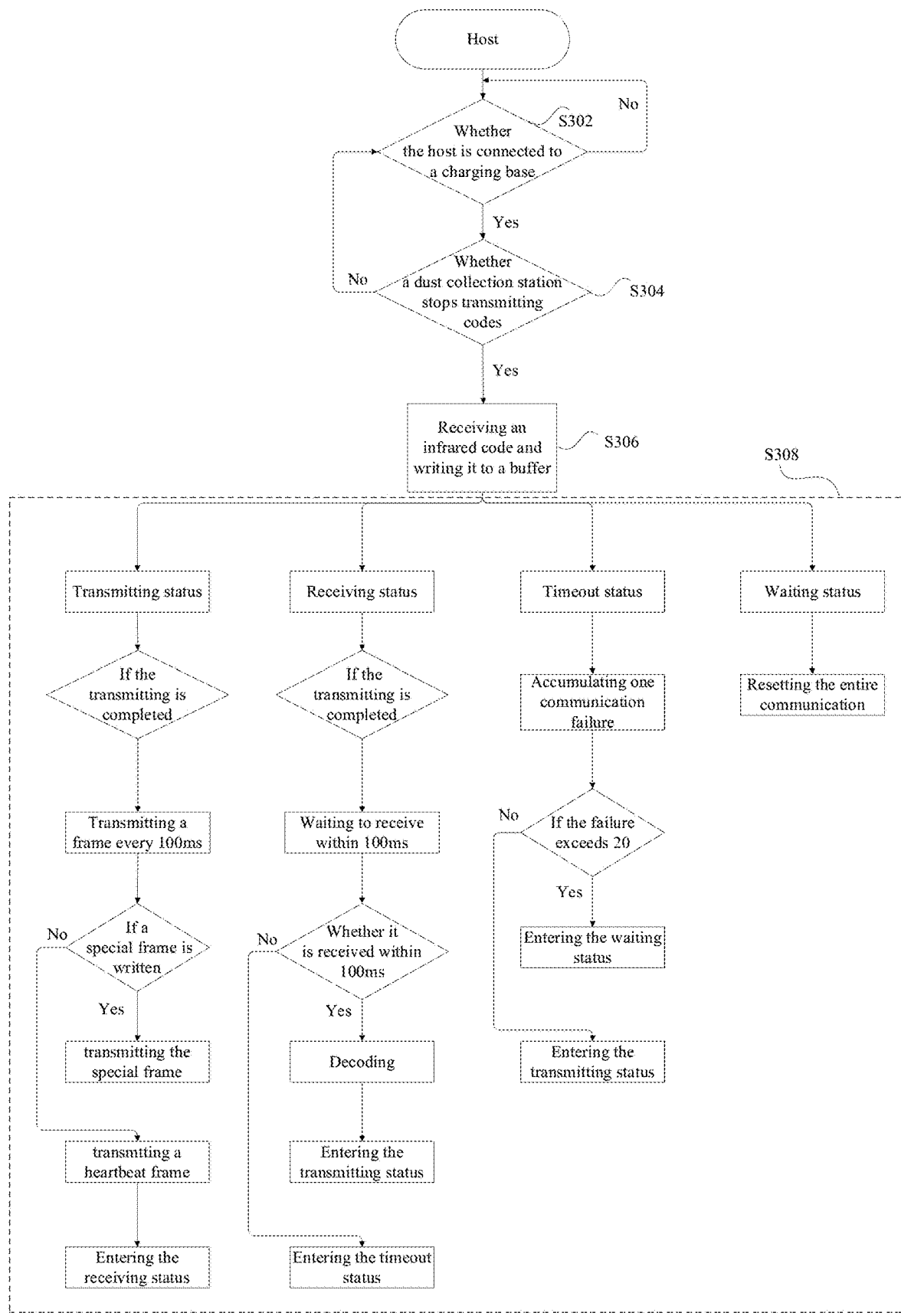
FIG. 3 is a flow diagram of another optional infrared communication method according to an embodiment of the present disclosure.

For the host, as shown in FIG. 3, the process of infrared communication method in the optional example may include the following steps:

Step S302: judging whether the host is connected to the charging base, if yes, executing Step S304, otherwise executing Step S302;

Step S304: judging whether the dust collection station stops transmitting codes, if yes, executing Step S306, otherwise executing Step S302;

Step S306: receiving an infrared code transmitted by the dust collection station and writing it to a buffer; and Step S308: performing infrared communication with the dust collection station.

The communication mode used for the infrared communication between the host and the dust collection station may be the master-slave response mode and involves in switching among the above four statuses:

the host is first in the transmitting status and transmits the infrared signal, if a special frame is written, the host transmits a feature frame, otherwise the host transmits the heartbeat frame and then enters the receiving status;

in the receiving status, the host waits for 100 ms to determine whether the host has received a reply signal transmitted by the dust collection station, if yes, the host performs decoding and enters the transmitting status, otherwise the host enters the timeout status;

in the timeout status, the host accumulates one communication failure, and judges whether the communication failure exceeds 20, if yes, the host enters the waiting status, otherwise the host enters the transmitting status; and in the waiting status, the host resets the entire communication (namely, the infrared communication).

Figure 4:
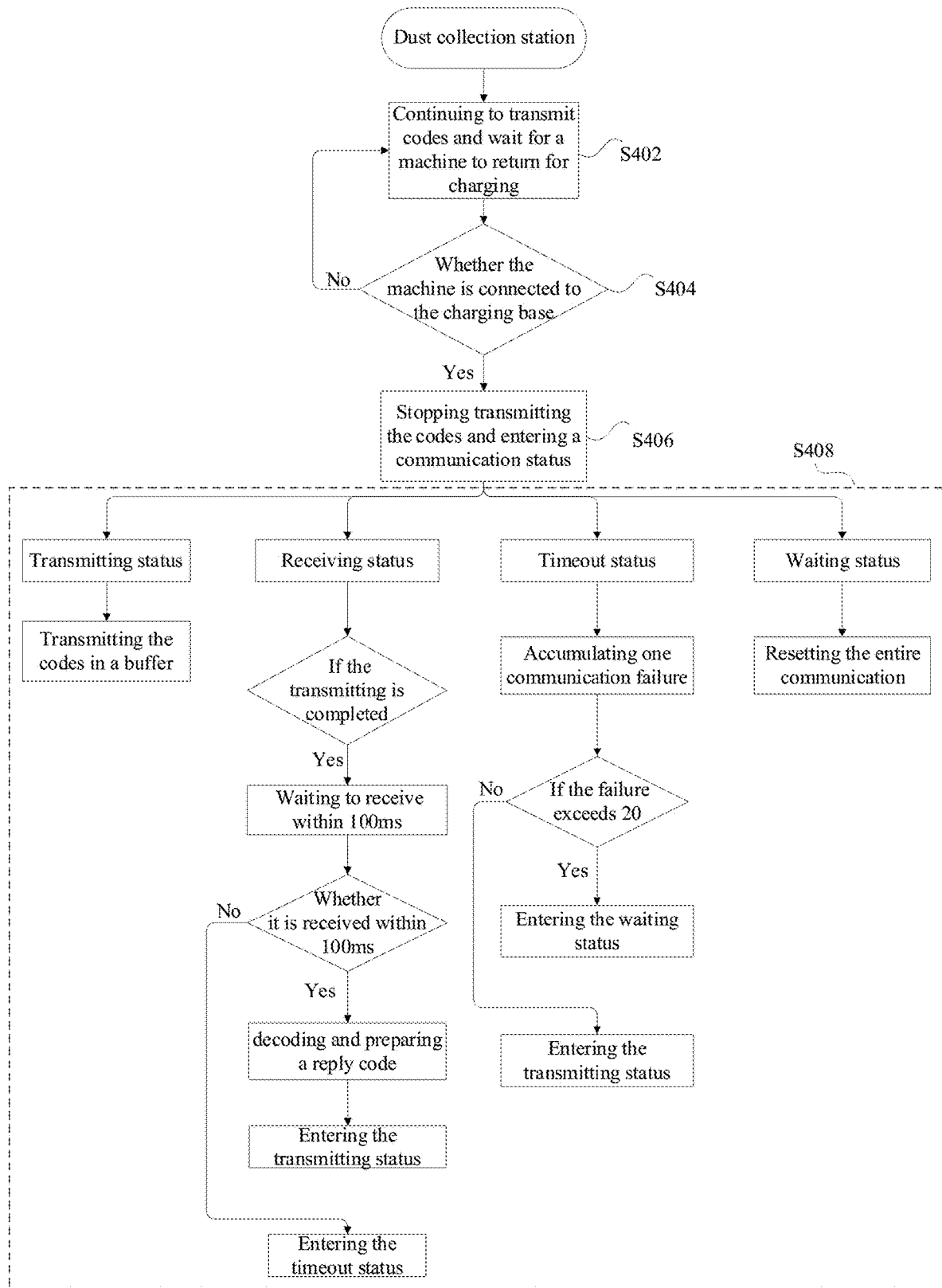
FIG. 4 is a flow diagram of still another optional infrared communication method according to an embodiment of the present disclosure.

For the dust collection station, as shown in FIG. 4, the process of infrared communication method in the optional example may include the following steps:

Step S402: continuing to transmit codes and waiting for a machine (namely, the host) to return for charging;

Step S404: judging whether the machine is connected to the charging base, if yes, executing Step S406, otherwise executing Step S402;

Step S406: stopping transmitting the codes and entering a communication status; and Step S408: performing the infrared communication with the machine.

The communication mode used for the infrared communication between the dust collection station and the host may be the master-slave response mode and involves in switching among the above four statuses:

the dust collection station is first in the receiving status and waits for 100 ms to determine whether the dust collection station has received a reply signal transmitted by the host, if yes, the dust collection station performs decoding, prepares the reply code and enters the transmitting status, otherwise the dust collection station enters the timeout status;

in the transmitting status, the dust collection station transmits a code (namely, the prepared reply code) in the buffer to the host and enters the receiving status;

in the timeout status, the dust collection station accumulates one communication failure, and judges whether the communication failure exceeds 20, if yes, the dust collection station enters the waiting status, otherwise the dust collection station enters the transmitting status; and in the waiting status, the dust collection station resets the entire communication (namely, the infrared communication).

Through the optional example, an infrared communication circuit can be simplified, and the anti-interference and error codes of the infrared communication can be ensured through a self-defined communication mechanism without the high frequency carrier. Meanwhile, the infrared bidirectional communication in a small space can be completed to ensure the integrity of information delivery, and the data volume is enough to complete the information interaction between the host and the dust collection station.

Through the above description of the implementations, persons skilled in the art may clearly understand that the methods in the above embodiments may be implemented by software with a necessary general hardware platform. Of course, the methods in the above embodiments may also be implemented by hardware. However, in many cases, the former is a preferred implementation. Based on such an understanding, the technical solutions of the present disclosure essentially or the part contributing to the prior art may be embodied in the form of a software product. The software product is stored in a storage medium (such as ROM (Read-Only Memory)/RAM (Random Access Memory), a magnetic disk, or an optical disc), and includes several instructions for instructing a terminal device (which may be a mobile phone, a computer, a server, a network device, or the like) to perform the methods described in the embodiments of the present disclosure.

Figure 5:
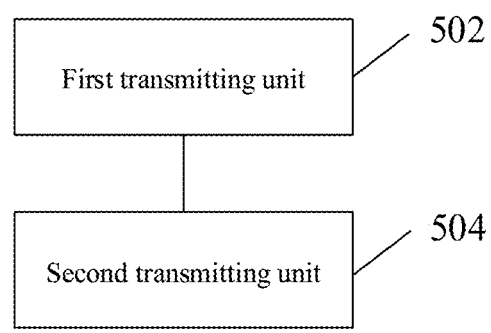
FIG. 5 is a structural block diagram of an optional infrared communication apparatus according to an embodiment of the present disclosure.

According to still another aspect of the embodiment of the present disclosure, an infrared communication apparatus for implementing the above infrared communication method is further provided. FIG. 5 is a structural block diagram of an optional infrared communication apparatus according to an embodiment of the present disclosure, as shown in FIG. 5, the apparatus may include:

- a first transmitting unit 502, configured to transmit a first infrared signal to a target communication terminal, where the first infrared signal is an infrared signal encoded based on a level duration; and
- a second transmitting unit 504, connected to the first transmitting unit 502, and configured to transmit a third infrared signal to the target communication terminal in a case that a second infrared signal replied by the target communication terminal based on the first infrared signal is received within a first target duration.

It should be noted that the first transmitting unit 502 in the embodiment may be used to execute the above Step S202, and the second transmitting unit 504 in the embodiment may be used to execute the above Step S204.

Through the above modules, the first infrared signal is transmitted to the target communication terminal, where the first infrared signal is an infrared signal encoded based on the level duration; and in a case that the second infrared signal replied by the target communication terminal based on the first infrared signal is received within the first target duration, the third infrared signal is transmitted to the target communication terminal, thereby solving a problem that bidirectional information interaction cannot be performed due to the inability of distinguishing bidirectional infrared signals in the infrared communication method in the related art, ensuring the bidirectional information interaction between communication terminals and reducing the cost of the infrared communication.

In an exemplary embodiment, the above apparatus further includes:

- a first determining unit, configured to determine a target communication mode for the infrared communication with the target communication terminal before transmitting the first infrared signal to the target communication terminal, where the target communication mode is a communication mode in which the target communication terminal is only allowed to reply after receiving an infrared signal of the local communication terminal; and
- a first controlling unit, configured to control the infrared communication between the local communication terminal and the target communication terminal according to the target communication mode.

In an exemplary embodiment, the first infrared signal is used for transmitting a header frame, an information frame, and a check frame, and the first transmitting unit includes:

- a first transmitting module, configured to transmit the header frame to the target communication terminal by a high-level signal within the first duration, where the header frame is used for indicating an initial position of the first infrared signal; and
- a second transmitting module, configured to transmit the information frame and the check frame to the target communication terminal, where a first symbol in the information frame and the check frame is transmitted by a high-level signal within a second duration, a second symbol in the information frame and the check frame is transmitted by a low-level signal within a third duration, and the second duration is different from the third duration.

In an exemplary embodiment, the first infrared signal carries a heartbeat frame, and the above apparatus further includes:

- a second determining unit, configured to: after transmitting the first infrared signal to the target communication terminal, in a case that the infrared signal replied by the target communication terminal based on the first infrared signal is not received within the first target duration, determine a cumulative number of times that an infrared signal replied by the target communication terminal is not received;
- an execution unit, configured to execute a reset operation on the infrared communication with the target communication terminal in a case that the cumulative number of times is greater than or equal to a target number of times threshold; and
- a third transmitting unit, configured to update the cumulative number of times and retransmit the first infrared signal to the target communication terminal in a case that the cumulative number of times is less than the target number of times threshold.

In an exemplary embodiment, the first infrared signal carries a target frame that is used for controlling the target communication terminal to execute a target operation, and the above apparatus further includes:

- a fourth transmitting unit, configured to: after transmitting the first infrared signal to the target communication terminal, in a case that the infrared signal replied by the target communication terminal based on the first infrared signal is not received within the first target duration, continuously transmit the first infrared signal to the target communication terminal within the first target duration until the infrared signal replied by the target communication terminal is received.

In an exemplary embodiment, the second transmitting unit includes:

- a third transmitting module, configured to transmit the third infrared signal carrying the heartbeat frame to the target communication terminal.

In an exemplary embodiment, the target communication terminal is a dust collection station, and the local communication terminal for transmitting the first infrared signal is a host, and the above apparatus further includes:

- a second controlling unit, configured to control the host connect to a charging base before transmitting the first infrared signal to the target communication terminal;
- a receiving unit, configured to wait to receive an indication signal transmitted by the dust collection station within the second target duration, where the indication signal is used for indicating that the host is not in a charging status; and
- a third controlling unit, configured to re-control the host to connect to the charging base in a case that the indication signal is received.

It should be noted herein that the above modules are the same as those in the examples and application scenarios implemented by the corresponding steps, but are not limited to the contents disclosed in the above embodiments. It should be noted that the modules, as a part of the apparatus, may run in the hardware environment as shown in FIG. 1, or may be implemented by software or hardware, where the hardware environment includes network environment.

According to still another aspect of the embodiment of the present disclosure, a storage medium is further provided. Optionally, in the embodiment, the above storage medium may be used to execute program codes of any one of the above infrared communication methods in the embodiments of the present disclosure.

Optionally, in the embodiment, the storage medium may be located on at least one network device among a plurality of network devices in the network as shown in the above embodiments.

Optionally, in the embodiment, the storage medium is configured to store program codes for executing the following steps:
  S1: transmitting a first infrared signal to a target communication terminal, where the first infrared signal is an infrared signal encoded based on a level duration; and
  S2: in a case that a second infrared signal replied by the target communication terminal based on the first infrared signal is received within a first target duration, transmitting a third infrared signal to the target communication terminal.

Optionally, specific examples in the embodiment may refer to the examples described in the above embodiments, and details are not described again in the embodiment.

Optionally, in the embodiment, the above storage medium may include, but is not limited to, any medium that may store the program codes, such as a USB flash disk, an ROM, an RAM, a removable hard disk, a magnetic disk, or an optical disc, etc.

According to still another aspect of the embodiment of the present disclosure, an electronic apparatus for implementing the above infrared communication methods is further provided and may be a server, a terminal, or a combination thereof.

Figure 6:
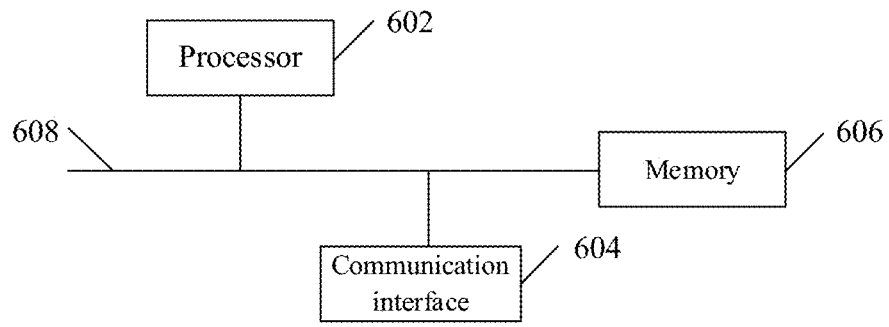
FIG. 6 is a structural block diagram of an optional electronic apparatus according to an embodiment of the present disclosure.

FIG. 6 is a structural block diagram of an optional electronic apparatus according to an embodiment of the present disclosure. As shown in FIG. 6, the electronic apparatus includes a processor 602, a communication interface 604, a memory 606, and a communication bus 608, where the processor 602, the communication interface 604, and the memory 606 communicate with each other through the communication bus 608, and the memory 606 is configured to store a computer program; and
  the processor 602 is configured to execute the computer program stored on the memory 606 to implement the following steps:
  S1: transmitting a first infrared signal to a target communication terminal, where the first infrared signal is an infrared signal encoded based on a level duration; and
  S2: in a case that a second infrared signal replied by the target communication terminal based on the first infrared signal is received within a first target duration, transmitting a third infrared signal to the target communication terminal.

Optionally, in the embodiment, the communication bus may be a PCI (Peripheral Component Interconnect) bus, an EISA (Extended Industry Standard Architecture) bus, or the like. The communication bus may be divided into an address bus, a data bus, a control bus, and the like. For the ease of representation, only one thick line is represented in FIG. 6, but this does not mean that there is only one bus or one type of bus. The communication interface is used for communication between the above electronic apparatus and other devices.

The above memory may include an RAM and may also include a non-volatile memory (non-volatile memory), for example, at least one disk memory. Optionally, the memory may also be at least one storage apparatus located far away from the aforementioned processor.

As an example, the above memory 606 may include, but is not limited to, the first transmitting unit 502 and the second transmitting unit 504 in the above infrared communication apparatus. In addition, the memory may also include, but is not limited to, other module units in the above infrared communication apparatus, and details are not described again in the example.

Optionally, the processor may be a general-purpose processor, may include, but is not limited to, a CPU (Central Processing Unit), an NP (Network Processor), and the like, and may also be a DSP (Digital Signal Processing), an ASIC (Application Specific Integrated Circuit), an FPGA (Field-Programmable Gate Array), other programmable logic devices, a discrete gate, a transistor logic device, or a discrete hardware component.

Optionally, specific examples in the embodiment may refer to the examples described in the above embodiments, and details are not described again in the embodiment.

A person of ordinary skill in the art may understand that the structure shown in FIG. 6 is only schematic, and the devices for implementing the above infrared communication methods may be terminal devices, and the terminal devices may be smart phones (such as Android phones and IOS phones, etc.), tablet computers, palmtop computers, mobile Internet Devices (MID), and PAD, etc. FIG. 6 imposes no limitation on the structure of the above electronic apparatus. For example, the electronic apparatus may further include more or fewer components (such as a network interface and a display apparatus) than those shown in FIG. 6, or have a configuration different from that shown in FIG. 6.

A person of ordinary skill in the art may understand that all or some steps of each method in the above embodiments may be implemented by instructing the hardware related to the terminal device via a program. The program may be stored in a computer-readable storage medium. The storage medium may include: a flash disk, a ROM, a RAM, a magnetic disk, the optical disc, or the like.

The above serial numbers of the embodiments of the present disclosure are only for a descriptive purpose, and do not represent the merits of the embodiments.

If an integrated unit in the above embodiments is implemented in a form of a software functional unit and sold or used as an independent product, it may be stored in the above computer-readable storage medium. Based on such an understanding, the technical solutions of the present disclosure essentially, the part contributing to the prior art, or all or some of the technical solutions may be implemented in a form of a software product. The computer software product is stored in a storage medium, and includes several instructions for instructing one or more computer devices (may be a personal computer, a server or a network device, or the like) to perform all or some steps of the method described in each embodiment of the present disclosure.

In the above embodiments of the present disclosure, the descriptions of each embodiment have their own emphasis. The part that is not described in detail in a certain embodiment may refer to relevant descriptions of other embodiments.

In several embodiments provided in the present disclosure, it should be understood that the disclosed client may be implemented in other manners. The apparatus embodiments described above are merely illustrative. For example, the division of units is merely logical function division and may be other division in actual implementation. For example, a plurality of units or components may be combined or integrated into another system, or some features may be ignored or may not be executed. In addition, the displayed or discussed coupling, direct coupling or communication connection between each other may be implemented through some interfaces. The indirect coupling or communication connection between the units or modules may be in electrical or other forms.

The units described as separate parts may or may not be physically separate, and parts displayed as units may or may not be physical units, namely, they may be located in one position, or may be distributed on a plurality of network units. Some or all units may be selected based on actual needs to achieve the objectives of the solutions provided in the embodiments.

In addition, each functional unit in each embodiment of the present disclosure may be integrated into one processing unit, or each unit may physically exist separately, or two or more units are integrated into one unit. The above integrated unit may be implemented in a form of hardware, or may be implemented in a form of a software functional unit.

The foregoing descriptions are merely preferred implementations of the present disclosure. It should be noted that a person of ordinary skill in the art may make several improvements or polishing without departing from the principle of the present disclosure, and these improvements and polishing shall also fall within the protection scope of the present disclosure.

The invention claimed is:

1. An infrared communication method, comprising:
   transmitting a first infrared signal to a target communication terminal in a case that a local communication terminal is in a transmitting status, wherein the local communication terminal is a host, the target communication terminal is a dust collection station, the first infrared signal is an infrared signal encoded based on a level duration that is defined based on a set value, and the local communication terminal switches to a receiving status after transmitting the first infrared signal;
   in a case that a second infrared signal replied by the target communication terminal based on the first infrared signal is received within a first target duration, transmitting a third infrared signal to the target communication terminal to start a new infrared communication between the local communication terminal and the target communication terminal;
   in a case that the first infrared signal carries a heartbeat frame, and an infrared signal replied by the target communication terminal based on the first infrared signal is not received within the first target duration, determining a cumulative number of times that the infrared signal replied by the target communication terminal is not received; in a case that the cumulative number of times is greater than or equal to a target number of times threshold, executing a reset operation on infrared communication with the target communication terminal; and in a case that the cumulative number of times is less than the target number of times threshold, updating the cumulative number of times and retransmitting the first infrared signal to the target communication terminal; and
   in a case that the first infrared signal carries a target frame, and the infrared signal replied by the target communication terminal based on the first infrared signal is not received within the first target duration, continuously transmitting the first infrared signal to the target communication terminal according to the first target duration until the infrared signal replied by the target communication terminal is received, or continuously transmitting the first infrared signal to the target communication terminal until verification timeout, wherein the target frame is used for controlling the target communication terminal to execute a target operation.

2. The method according to claim 1, wherein before the transmitting a first infrared signal to a target communication terminal, the method further comprises:
   determining a target communication mode used for infrared communication with the target communication terminal, wherein the target communication mode is a communication mode in which the target communication terminal is only allowed to reply after receiving an infrared signal of a local communication terminal; and
   controlling infrared communication between the local communication terminal and the target communication terminal according to the target communication mode.

3. The method according to claim 1, wherein the first infrared signal is used for transmitting a header frame, an information frame, and a check frame; and the transmitting a first infrared signal to a target communication terminal comprises:
   transmitting the header frame to the target communication terminal by a high-level signal within a first duration, wherein the header frame is used for indicating an initial position of the first infrared signal; and
   transmitting the information frame and the check frame to the target communication terminal, wherein a first symbol in the information frame and the check frame is transmitted by a high-level signal within a second duration, a second symbol in the information frame and the check frame is transmitted by a low-level signal within a third duration, and the second duration is different from the third duration.

4. The method according to claim 1, wherein the transmitting a third infrared signal to the target communication terminal comprises:
   transmitting the third infrared signal carrying a heartbeat frame to the target communication terminal.

5. The method according to claim 1, wherein before the transmitting a first infrared signal to a target communication terminal, the method further comprises:
   controlling the host to connect to a charging base;
   waiting to receive an indication signal transmitted by the dust collection station within a second target duration, wherein the indication signal is used for indicating that the host is not in a charging status; and
   in a case that the indication signal is received, re-controlling the host to connect to the charging base.

6. The method according to claim 2, wherein before the transmitting a first infrared signal to a target communication terminal, the method further comprises:
   controlling the host to connect to a charging base;
   waiting to receive an indication signal transmitted by the dust collection station within a second target duration, wherein the indication signal is used for indicating that the host is not in a charging status; and
   in a case that the indication signal is received, re-controlling the host to connect to the charging base.

7. The method according to claim 3, wherein before the transmitting a first infrared signal to a target communication terminal, the method further comprises:
   controlling the host to connect to a charging base;
   waiting to receive an indication signal transmitted by the dust collection station within a second target duration, wherein the indication signal is used for indicating that the host is not in a charging status; and
   in a case that the indication signal is received, re-controlling the host to connect to the charging base.

8. The method according to claim 4, wherein before the transmitting a first infrared signal to a target communication terminal, the method further comprises:
- controlling the host to connect to a charging base;
- waiting to receive an indication signal transmitted by the dust collection station within a second target duration, wherein the indication signal is used for indicating that the host is not in a charging status; and
- in a case that the indication signal is received, re-controlling the host to connect to the charging base.

9. An infrared communication apparatus, comprising:
- a first transmitting unit, configured to transmit a first infrared signal to a target communication terminal in a case that a local communication terminal is in a transmitting status, wherein the local communication terminal is a host, the target communication terminal is a dust collection station, the first infrared signal is an infrared signal encoded based on a level duration that is defined based on a set value and carries a target frame or a heartbeat frame, the target frame is used for controlling the target communication terminal to execute a target operation, and the local communication terminal switches to a receiving status after transmitting the first infrared signal;
- a second transmitting unit, configured to transmit a third infrared signal to the target communication terminal to start a new infrared communication between the local communication terminal and the target communication terminal in a case that a second infrared signal replied by the target communication terminal based on the first infrared signal is received within a first target duration;
- a second determination unit, configured to: in a case that the first infrared signal carries the heartbeat frame, and an infrared signal replied by the target communication terminal based on the first infrared signal is not received within the first target duration, determine a cumulative number of times that the infrared signal replied by the target communication terminal is not received;
- an execution unit, configured to execute a reset operation on infrared communication with the target communication terminal in a case that the cumulative number of times is greater than or equal to a target number of times threshold;
- a third transmitting unit, configured to update the cumulative number of times and retransmit the first infrared signal to the target communication terminal in a case that the cumulative number of times is less than the target number of times threshold; and
- a fourth transmitting unit, configured to: in a case that the first infrared signal carries the target frame, and the infrared signal replied by the target communication terminal based on the first infrared signal is not received within the first target duration, continuously transmit the first infrared signal to the target communication terminal according to the first target duration until the infrared signal replied by the target communication terminal is received, or continuously transmit the first infrared signal to the target communication terminal until verification timeout.

10. An electronic apparatus, comprising a memory and a processor, wherein a computer program is stored in the memory, and the processor is configured to execute the method according to claim 1 through the computer program.

11. An electronic apparatus, comprising a memory and a processor, wherein a computer program is stored in the memory, and the processor is configured to execute the method according to claim 2 through the computer program.

12. An electronic apparatus, comprising a memory and a processor, wherein a computer program is stored in the memory, and the processor is configured to execute the method according to claim 3 through the computer program.

13. An electronic apparatus, comprising a memory and a processor, wherein a computer program is stored in the memory, and the processor is configured to execute the method according to claim 4 through the computer program.

14. An electronic apparatus, comprising a memory and a processor, wherein a computer program is stored in the memory, and the processor is configured to execute the method according to claim 5 through the computer program.

15. An electronic apparatus, comprising a memory and a processor, wherein a computer program is stored in the memory, and the processor is configured to execute the method according to claim 6 through the computer program.

16. An electronic apparatus, comprising a memory and a processor, wherein a computer program is stored in the memory, and the processor is configured to execute the method according to claim 7 through the computer program.

17. An electronic apparatus, comprising a memory and a processor, wherein a computer program is stored in the memory, and the processor is configured to execute the method according to claim 8 through the computer program.

* * * * *